Patented Mar. 13, 1951

2,544,936

UNITED STATES PATENT OFFICE 2,544,936

INDAZOLE AZO DYESTUFF

Pierre Petitcolas, Rouen, Robert Frédéric Michel Sureau, Mont-St.-Aignan, and André Paul Richard, Oissel, France, assignors to Societe Anonyme de Matieres Colorantes et Produits Chimiques Francolor, Paris, France, a French company No Drawing. Application May 6, 1947, Serial No. 746,310. In France May 14, 1946

1 Claim. (Cl. 260—157)

A long while ago acetoacetyl derivatives of amino azo compounds of the benzene series were proposed for use as coupling components for ice colours. However these derivatives have never found industrial application, probably because of lack of fastness and brightness of the shades obtained.

It has now been found that disazo and trisazo dyestuffs obtained by coupling, in bulk or on the fibre respectively, a diazo or tetrazo component, not containing other solubilising groups than the diazo group, with a coupling component consisting of an acetoacetyl derivative of respectively a monoaminoazo or diaminoazo compound, are of industrial importance if they contain in their molecule one or more indazole, benzimidazole, or benztriazole nuclei.

Such dyestuffs have the general formula:

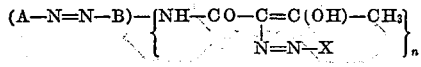

in which A, B and X are nuclei at least one of which is selected from the group which consists of indazole, benzimidazole and benztriazole nuclei, any which are not selected from said group being benzene nuclei, X being free from solubilising groups and n being an integer from 1 to 2. These dyes are made by diazotising a compound of the formula X—NH2 and coupling it with a compound of the formula:

If a nucleus selected from the group which consists of indazole, benzimidazole and benztriazole nuclei be referred to as a "Z" nucleus, the "Z" nuclei may be distributed as follows in the molecule of the dyestuff:

(1) No "Z" nucleus in the coupling component and one in the diazo component; i. e., X is a "Z" nucleus and A and B are benzene nuclei.

(2) One "Z" nucleus in the coupling component and none in the diazo component; i. e., X is a benzene nucleus and either A is a "Z" nucleus and B is a benzene nucleus or B is a "Z" nucleus and A is a benzene nucleus.

(3) Two "Z" nuclei in the coupling component and none in the diazo component; i. e. A and B are "Z" nuclei and X is a benzene nucleus.

(4) One "Z" nucleus in the coupling component and one in the diazo component; i. e. either A and X are "Z" nuclei and B is a benzene nucleus or B and X are "Z" nuclei and A is a benzene nucleus.

(5) Two "Z" nuclei in the coupling component and one in the diazo component; i. e. A, B and X are all "Z" nuclei.

The acetoacetylamine chain or chains can be situated ortho or para to the azo linkage between A and B of the coupling component.

In the second and fourth cases defined above, in the case of a mono acetoacetylamino compound, the acetoacetylamino group can be on the indazole, benzimidazole or benztriazole nucleus, or else on the nucleus attached to this by the azo linkage of the coupling component; i. e. it may be on the A or B nucleus.

Whatever may be, moreover, the relative position of the indazole, benzimidazole or benztriazole group or groups in the molecule of the dyestuff finally obtained, the presence of these groups gives to the latter the property of fixing heavy metals, particularly copper, to give metallic lakes. This property allows of obtaining a whole range of brown shades from yellowish browns to blacks, passing through reddish browns and violet or corinth browns, and even of obtaining greens in certain cases.

In particular it has been found that when the molecule of the coupling component contains one or two indazole, benzimidazole or benztriazole nuclei (i. e. when either A or B or both of them is or are "Z" nuclei) and presents the following characteristics:

(1) a heterocyclic nuclear nitrogen ortho to the azo linkage;

(2) an alkoxy group ortho to the same linkage, coppering brings out a much more considerable deepening of colour than if these conditions are not realised, leading thus to negro head browns, corinth browns and even blacks. It is also in this category that the green combinations obtained after coppering occur.

Finally, in all cases, but especially in those which have just been mentioned coppering brings about a very considerable improvement in fastness to different tests and in particular to light.

The amino indazoles, amino benzimidazoles, and amino benztriazoles used in the preparation of the dyestuffs according to the invention are obtained by processes already described in chemical literature.

From these amines, used as diazo components or coupling components there are prepared, according to general known methods, amino azo compounds which may be then condensed with acetoacetic esters to transform them into acetoacetylamino azo compounds.

Acetoacetyl groups can also be introduced into the azo derivatives of benzimidazoles, indazoles, or benztriazoles by reduction of nitro groups and acetoacetylation, or by saponification of acetoamino groups and acetoacetylation.

The fixing on the fibre of dyestuffs in accordance with the inventions can be brought about by dyeing, foularding or printing, directly or on passing through the intermediate stages of nitrosamine or Schiff's base and in general according to all the known techniques which may be used for ice colours.

An azo dyestuff of the general formula

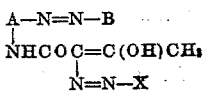

in which A, B and X are nuclei at least one of which is an indazole, benzimidazole or benztriazole nucleus, X being free from solubilising groups, is prepared, according to the invention, by diazotising a compound of the formula XNH₂ and coupling it with a compound of the general formula

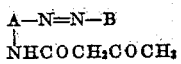

The following examples illustrate, without limiting, the invention.

*Example 1*

By diazotisation of 7-amino-indazole and coupling with amino-2:5-dimethoxyaniline there is obtained an aminoazo derivative of the constitution.

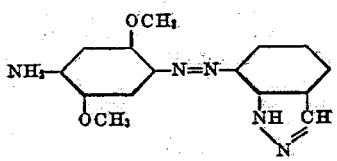

which is acetoacetylated according to the following method: In an apparatus provided with a first reflux condenser, in which circulates a current of steam, and with a second reflux condenser in which circulates a current of cold water, there is heated up to commencement of distillation 600 g. of chlorobenzene
    25 g. of acetoacetic ester
    1 g. of triethanolamine Then there is introduced, over three quarters of an hour, with stirring, a filtered solution, kept at a temperature near boiling of 30 g. of 4-amino-2:5-dimethoxybenzene-azo-7-indazole in 600 g. of chlorobenzene.

The temperature is regulated so as to obtain a slow distillation of chlorobenzene, which drives off the alcohol formed in the reaction. It is heated for an hour more after the end of the introduction of the above mentioned solution so as to drive off in all 920 parts of chlorobenzene. It is allowed to cool while stirring, the acetoacetyl derivative crystallises in fine brick red crystals.

It is filtered, sucked dry, washed with benzene and dried in vacuo. There is obtained 27 parts of the said acetoacetyl derivative.

4 parts of the above aminoazo derivative thus obtained, are dissolved in the cold in Denatured ethyl alcohol 20 cc.
    Water 10 cc.
    36° Bé. caustic soda 6 cc.

and this solution is allowed to flow into a solution containing

Water 1000 cc.
    Caustic soda 36° Bé. 10 cc.
    Anhydrous sulphate of soda 40 g.
    Sulphoricinate of soda 5 cc.

50 grams of cotton are immersed in this bath for half an hour at ordinary temperature, the cotton is then wrung out, and the colour is developed in a diazo bath (1000 grams) containing 15 grams of stabilised diazo derivative of p-nitraniline of 20% as base (percentage calculated in weight of p-nitraniline entering into formation of the diazo salt). After half an hour's development it is rinsed and the fibre treated for half an hour at 85–95° C. with the following bath Crystalline copper sulphate 2.5 g.
    Monoethanolamine 5 g.
    Water 1000 g.

After rinsing it is boiled for half an hour in a bath containing 1.5 g. litre of sodium carbonate and and 1.5 g. litre of soda soap having 70% of fatty material.

There is obtained a brownish black shade of excellent properties as regards fastness, in particular to light.

*Example 2*

4 parts of the product corresponding to the formula

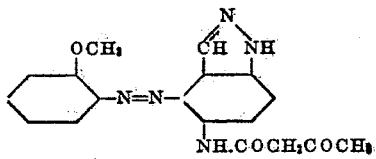

are pasted in 10 g. warm methyl alcohol. There is added 1 cc. of caustic soda of 36° Bé. The limpid solution thus obtained is poured into the following solution:

Cold water up to 1000 g.
    Anhydrous sodium sulphate 40 g.
    Sulphoricinate of soda 5 g.
    Caustic soda 36 Bé. 10 cc.

50 g. of cotton are immersed in this bath for half an hour. The cotton is then pressed out in the cold and developed, according to the usual technique for ice colours, in a bath of 1000 g. of water containing 15 g. of the diazo salt of an aminoanthraquinone stabilised at 20% base.

After developing and rinsing the fibre is treated for half an hour at 85–90° C. in the following bath Copper sulphate (crystalline) 2.5 g.
    Monoethanolamine 5 g.
    Water 1000 g.

It is finally rinsed and boiled for half an hour in a bath containing 2 grams per litre sodium carbonate and 2 grams per litre Marseilles soap. After rinsing and drying there is obtained a sepia brown of excellent fastness.

*Example 3*

There is dissolved in 10 g. of methyl alcohol and 1.1 cc. of 36° Bé. caustic soda, 4 g. of the product of the following formula:

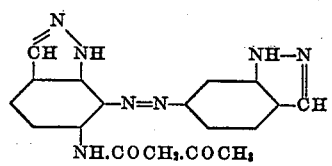

The alcoholic solution is poured into the following bath

Cold water up to 1000 g.
Anhydrous sodium sulphate 30 g.
Sulphoricinate of soda 5 g.
Caustic soda 36° Bé. 10 cc.

50 g. of cotton are worked in this for half an hour, pressed out and developed in a bath of 15 g. per litre of the stabilised diazo compounds of o-nitraniline of 20%, suitably neutralised. It is finished as in Example 1 and there is obtained a chocolate brown of good fastness.

*Example 4*

In operating with a product of the formula

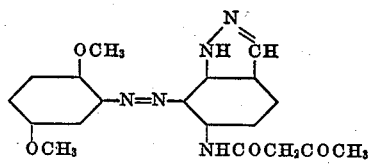

as has already been explained in the preceding example but by only using 20 g. of sulphate of soda per litre of impregnation bath and developing in a diazo bath of o-chloroaniline, there is obtained after coppering and boiling out, a green shade having excellent fastness.

The following table illustrates the shades obtained by means of the different combinations obtained on the fibre in the manner described in the foregoing examples.

| Coupling component | Diazo component | Shade |
|---|---|---|
| CH₃COCH₂CONH—⌬(CH₃)—N=N—⌬(CH₃)—NHCOCH₂COCH₃ | Cl-⌬(CH=N-NH)-NH₂ | Dull negro head brown. |
| CH₃COCH₂CONH—⌬(Cl)—N=N—⌬(Cl)—NHCOCH₂COCH₃ | Cl-⌬(CH=N-NH)-NH₂ | Black. |
| ⌬(OCH₃)—N=N—⌬(CH NH / N)—NHCOCH₂COCH₃ | NO₂-⌬-OCH₃, NH₂ | Yellow brown. |
| ⌬(Cl)—N=N—⌬(CH NH / N)—NHCOCH₂COCH₃ | Cl-⌬-NH₂, OCH₃ | Bistre. |
| Do. | NO₂-⌬-OCH₃, NH₂ | Reddish brown. |
| Do. | Cl-⌬(CH=N-NH)-NH₂ | Negro head. |
| CH₃COCH₂CONH—⌬(OCH₃, OCH₃)—N=N—⌬(NH CH / N) | ⌬-NH₂, Cl | Dull corinth brown. |
| Do. | ⌬-NH₂, CO-CO | Dull negro head. |

| Coupling component | Diazo component | Shade |
|---|---|---|
| 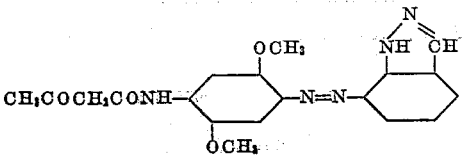 | 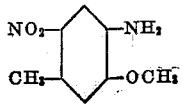 | Black brown. |
| Do | 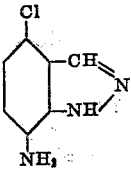 | Black. |
| 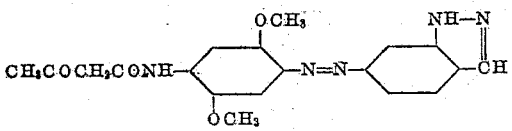 | 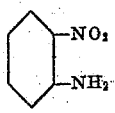 | Orange brown. |
| Do | 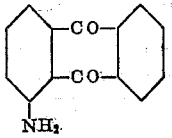 | Sepia brown. |
| Do | 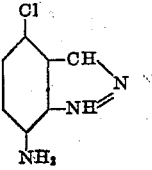 | Chocolate brown. |
| 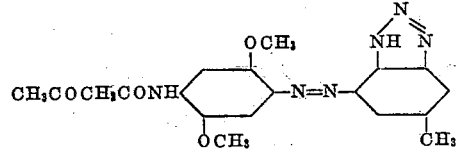 | 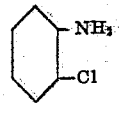 | Maroon. |
| Do | 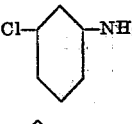 | Do. |
| 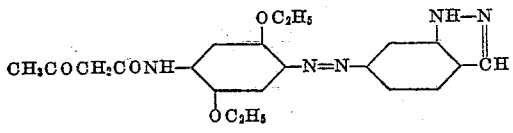 | 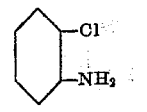 | Yellow ochre. |
| Do | 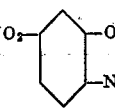 | Bistre brown. |
| 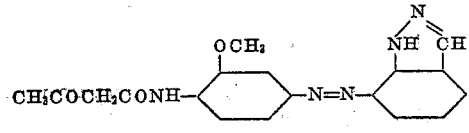 | 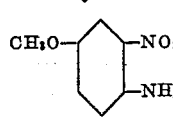 | Reddish brown. |
| Do | 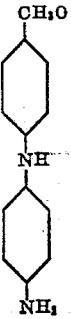 | Negro head. |

| Coupling component | Diazo component | Shade |
|---|---|---|
| [structure: dimethoxy/methyl benzene with NHCOCH₂COCH₃, azo-linked to triazole ring] | [benzene with NH₂ and Cl] | Chocolate brown. |
| Do | [benzene with NH₂ and NO₂] | Violet brown. |
| [structure: CH₃COCH₂CONH-benzene(OCH₃)₂-N=N-benzene-Cl with triazole] | [benzene with NH₂, NO₂, OCH₃] | Brownish black. |
| Do | [benzene with NH₂ and Cl] | Black brown. |
| [structure: CH₃COCH₂CONH-benzene(CH₃)(OCH₃)-N=N- with triazole] | [benzene with NH₂ and NO₂] | Negro head. |
| [structure: benzene(OCH₃)₂-N=N-benzene-NH-COCH₂COCH₃ with triazole] | [benzene with 2 Cl and NH₂] | Green. |
| [structure: benzene(OCH₃)₂-N=N-benzene-NH-COCH₂COCH₃ with triazole] | [benzene with CH₃, NO₂, NH₂] | Green. |
| Do | [benzene with Cl and NH₂] | Green bronze. |
| Do | [benzene with NO₂, OCH₃, NH₂] | Olive brown. |
| [structure: benzene(OCH₃)₂-N=N-benzene-NHCOCH₂COCH₃ with triazole] | [benzene with NH₂ and Cl] | Olive grey. |
| Do | [benzene with NH₂ and NO₂] | Do. |
| [structure: CH₃COCH₂CONH-benzene(CH₃)-N=N-benzene(OCH₃)₂ with triazole] | [benzene with NH₂ and Cl] | Bordeaux brown. |
| Do | [benzene with Cl and NH₂] | Dull chocolate brown. |

| Coupling component | Diazo component | Shade |
|---|---|---|
| CH₃COCH₂CONH—[phenyl]—N=N—[triazole-NH-COCH₂COCH₃] | [phenyl with NO₂, NH₂] | Bistre brown. |
| Do | [phenyl-CO-CO-phenyl-NH₂] | Chocolate brown. |
| CH₃COCH₂CCNH—[phenyl-OCH₃]—N=N—[triazole-NH-COCH₂COCH₃] | [phenyl with Cl, NH₂, NO₂] | Bordeaux brown. |
| Do | [phenyl with Cl, CH, N, NH, NH] | Dull negro head. |
| [triazole-phenyl]—N=N—[triazole-phenyl-NHCOCH₂COCH₃] | [phenyl with NH₂, Cl] | Corinth brown. |
| [triazole-phenyl]—N=N—[triazole-phenyl-NH-CO-CH₂-COCH₃] | [phenyl with NH₂, NO₂, OCH₃] | Black brown. |
| Do | [phenyl-CO-CO-phenyl-NH₂] | Brownish black. |
| [triazole-phenyl]—N=N—[phenyl-triazole, NHCOCH₂COCH₃] | [phenyl with NO₂, OCH₃, NH₂] | Chocolate brown. |
| Do | [phenyl with CH₃O, NO₂, NH₂] | Violet brown. |

| Coupling component | Diazo component | Shade |
|---|---|---|
| 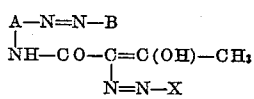 | Cl—⬡—NH₂, NO₂ | Chocolate brown. |
| Do | CH₃O—⬡—NH₂, NO₂ | Chocolate brown, yellower than the foregoing. |
| Do | ⬡—NH—⬡—NH₂, NH—⬡—NH₂ | Dull negro head. |
| (indazole-azo-phenyl with NHCOCH₂COCH₃) | ⬡—NH₂, Cl | Dull chamois brown. |
| (indazole-azo-phenyl with NHCOCH₂COCH₃) | ⬡—NH₂, Cl | Reddish brown. |
| (indazole-azo-phenyl with NHCOCH₂COCH₃) | NO₂—⬡—NH₂, CH₃, OCH₃ | Negro head. |
| Do | Cl—⬡—indazole, NH₂ | Do. |

We declare that what we claim is:

A copperable azo dyestuff of the general formula:

$$A-N=N-B$$
$$\underset{N=N-X}{NH-CO-C=C(OH)-CH_3}$$

in which X is a benzene nucleus free from solubilising groups, B is a benzene nucleus having an alkoxy group in the ortho position to the azo linkage shown between A and B and A is an indazole nucleus having an imino nitrogen atom in the ortho position to the azo linkage shown between A and B.

PIERRE PETITCOLAS.
ROBERT FRÉDÉRIC MICHEL SUREAU.
ANDRÉ PAUL RICHARD.

REFERENCES CITED

The following references are of record in the file of this patent:

UNITED STATES PATENTS

| Number | Name | Date |
|---|---|---|
| 2,043,869 | Schmid | June 9, 1936 |
| 2,109,552 | Schindhelm et al. | Mar. 1, 1938 |
| 2,136,136 | Johner et al. | Nov. 8, 1938 |
| 2,195,011 | Petitcolas et al. | Mar. 26, 1940 |
| 2,308,023 | Peterson | Jan. 12, 1943 |
| 2,315,220 | Petitcolas et al. | Mar. 30, 1943 |
| 2,346,531 | Allen et al. | Apr. 11, 1944 |